Sept. 24, 1935.  H. M. FLINT  2,015,070

VALVE STEM FOR PNEUMATIC TUBES

Filed Sept. 18, 1933

Inventor
Harry M. Flint.
By
Attorney

Patented Sept. 24, 1935

2,015,070

UNITED STATES PATENT OFFICE 2,015,070

VALVE STEM FOR PNEUMATIC TUBES

Harry M. Flint, Denver, Colo., assignor to The Gates Rubber Company, Denver, Colo., a corporation of Colorado Application September 18, 1933, Serial No. 689,932

5 Claims. (Cl. 152—12)

This invention relates to improvements in valve stems for pneumatic tubes.

Inner tubes employed in the tires of heavy duty trucks engaged in long distance transportation are subjected to great temperature variations which often are high enough to exert a curing effect on the rubber and which must be taken into consideration in the original curing operation at the factory.

Experience has shown that an overcured inner tube does not give as long service in long distance trucking as a slightly undercured tube and it is therefore preferable to employ inner tubes that are slightly undercured when they are first put into use and to depend on the heat generated during the travel of the truck to gradually complete the curing.

There are two methods in common use for curing inner tubes, one of which employs air or other gas and the other of which employs steam.

The use of air is objectionable for several reasons among which may be mentioned that the oxygen present in the air in a highly heated condition oxidizes the surface of the rubber and gives it a tacky varnish-like surface. Since the surface in contact with the air during the curing operation is the inner surface, it is evident that the opposite sides of this surface will adhere when the tube is collapsed and made ready for packing. In order to overcome the objectionable feature due to the tacky inner surface, the tubes are usually overcured when the air method is employed and the life of the tube is thereby greatly shortened.

Another objection to the use of air in curing tubes is that they are cured from the mould side only with the result that the time required is much longer than that required when steam is used. Where there are irregularities in the thickness of the wall, as, for example, double thicknesses at the splices and the valve pad, the cure is uneven with the result that the thicker portions are nearly always undercured. In moulded tubes there is also a difference in thickness between the rim portion and the crown portion and therefore the cure is not uniform when air or gas is employed. Air or gas when it expands absorbs heat and as a result of this the valve stem through which it enters is cooled so that that portion of the valve pad adjacent the stem remains undercured to a depth of from one sixteenth to one quarter of an inch. Due to the cooling effect of the expanding air or gas, the valve pad can not be properly cured unless the thinner portions are overcured and as a result the valve nut must be tightened before the tube is inserted in a tire and even then leaks at this point will develop.

It has been found that by substituting steam for the air in the curing operation, the inner surface becomes dense and dry and does not stick together when the tube is collapsed. Even if the tube is considerably undercured the inner surface is such that it will not stick, which makes it possible to put tubes cured by this method in boxes in a considerably undercured condition. When inner tubes cured by steam are employed in trucks for long distance hauling, they last much longer than the overcured tubes in the curing of which air was used.

When steam is substituted for air, the tube will be cured from both sides and the time will be greatly reduced as the time necessary for a proper cure varies with the thickness and since curing takes place from both sides, the time is reduced to one-half of that required when air is used.

When steam expands it gives up heat instead of absorbing heat as air and gas will do and therefore the rubber surrounding the valve stem will be properly cured from the heat transmitted to it from the valve stem. When steam is employed for curing a more uniform cure will be obtained and a much shorter time required than when air is used.

In the apparatus employed for curing inner tubes, they are held in an inclined position during the curing operation and when steam is employed, the water from the condensed steam collects at the lowermost point and usually covers a considerable area of the inner surface. The presence of water in the tube acts as a heat insulator and shields the surface of the tube from direct contact with the steam and therefore the area thus covered with water does not get cured to the same extent as the other portions of the surface.

It is the object of this invention to produce a valve stem for use in carrying out a method for the steam curing of inner tubes that will prevent the water of condensation from collecting and which will therefore result in a uniform curing of the tube.

My improved method which forms the subject of a separate application, briefly described, consists in circulating the steam at a high velocity through the tube during the curing operation, whereby the water of condensation will be kept in motion and prevented from accumulating at the lowest point as it does when the ordinary method is employed and which therefore produces a uniform heat distribution throughout the interior of the tube.

Since the time necessary for curing a tube when steam is used, ranges from five to fifteen minutes, there is a rapid absorption of heat which requires a continual admission of steam which makes it possible to maintain a high velocity of the steam within the tube during the entire period.

In order to describe the method and the apparatus by means of which it is carried out, reference will be had to the accompanying drawing in which the apparatus has been illustrated, and in which.

Figure 1:
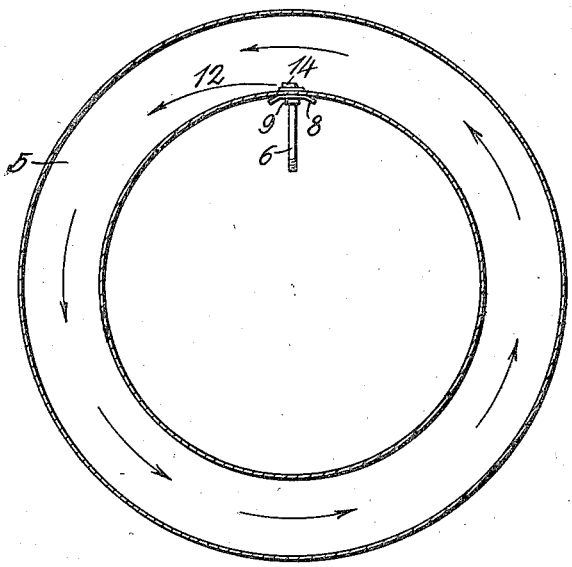
Fig. 1 is a section through an inner tube showing my improved valve stem in place therein and showing also the path of the steam.
Figure 3:
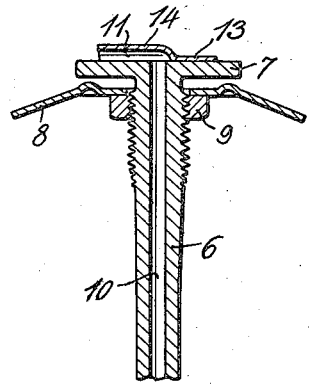
Fig. 3 is a longitudinal section through my improved valve.
Figure 4:
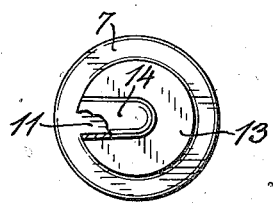
Fig. 4 is a top plan view of the valve.

In the drawing numeral 5 represents the inner tube to be cured and numeral 6 the valve stem. The valve stem has a circular head 7 at one end, which head is located on the inside of the tube as shown in Fig. 1. A washer 8 is secured to the valve stem and is held against the inner surface by means of a nut 9. The valve stem has an opening 10. The valve stem shown in Figs. 3 and 4 differs from the ordinary valve stem in this, that the inner end of opening 10 communicates with a transverse opening 11 which extends in the direction of the circumference of the tube so that the steam will issue in the direction of arrow 12 in Fig. 1. The valve stem illustrated in Figs. 3 and 4 is an ordinary valve stem to which a disk 13 has been soldered. Disk 13 has a pressed out portion 14 which defines three walls of the cavity 11. The valve stem can, of course, be made in a specifically different manner from that shown and described as the only requirement is that the steam shall be discharged substantially at right angles to opening 10 and in the direction of the circumference of the tube.

It is evident that if steam is introduced to the inside of the tube in the direction of arrow 12, it will produce a current of steam in the interior of the tube in a circumferential direction and this current will travel at a high velocity with the result that the water of condensation will be carried along and prevented from accumulating at the lowest, or at any point. By the simple expedient of maintaining a high velocity and an endless current of steam in the tube the heat will be uniformly distributed and, every portion of the wall will be affected equally by the heat and will be equally cured, since the fluid contents of the tube are homogeneous in character.

Figure 2:
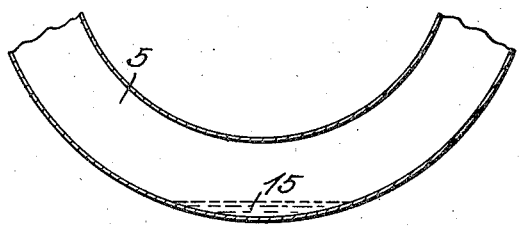
Fig. 2 is a fragmentary section showing how and where the water accumulates during the curing operation.

In Fig. 2 numeral 15 indicates the water of condensation and shows how it accumulates at the lowest point in the tube when the steam is introduced into the cavity of the tube in the direction of the opening 10, and in the absence of the deflecting feature 14. When the steam is introduced as shown in Fig. 1, uniform heat distribution and curing is obtained and therefore the tubes have uniform strength throughout, while tubes cured by steam in the ordinary way and in which water accumulates, as shown in Fig. 2, have a weak area corresponding to that covered by the water.

Having described the invention what is claimed as new is:

1. In a tubular valve stem of the type employed in connection with pneumatic tubes and which is provided at its inner end with a head that is located within the tube and which engages the inner surface of the tube, the valve stem having an opening that extends through the head, a deflector attached to the head and provided with means for changing the direction of steam and for directing it tangentially during the steam curing operation whereby a high velocity circulation of steam will be set up that prevents condensed steam from separating and collecting at the lowest point.

2. A tubular valve stem of the type employed in connection with pneumatic tubes and through which steam is introduced into the tubes during the curing operation, comprising a tubular stem having its inner end provided with a thin flat head that is located within the tube and has one side in contact with the inner surface of the tube, the opening in the tube extending through the head, and a deflector plate attached to the inner surface of the head, the plate having one side provided with a narrow elongated depression that extends from a point near the center of the plate to the edge thereof, the plate being so positioned on the head that the opening in the stem and head is in communication with the depression which forms a prolongation of the opening and which directs the steam tangentially of the tube, thereby producing a circulation of steam in the tube during curing operation.

3. A valve stem adapted to introduce fluid into a vulcanizable container during the process of curing, comprising a tubular externally threaded stem for extending through the wall of the container, a disk like head, the head adapted to lie within the container in sealing contact with the inner wall thereof, the bore of the tubular stem being extended through the head, a baffle plate secured to said head in spaced relation to the opening of the end of the bore whereby fluid entering through the bore is deflected in a plane approximately parallel to the plane of said head so that it cannot impinge upon the wall of the container opposite the point of attachment of the stem.

4. A device in accordance with claim 3 in which the head and baffle have cooperating surfaces forming a discharge passage at an approximate right angle to the bore of the tubular stem, and connected therewith.

5. A valve stem having a base at its inner end, a bore extending through the stem having an unobstructed portion terminating centrally of the inner face of the base, and deflecting means carried by said base and having a portion spaced outwardly from and overlying the inner end of the bore and of a width greater than the diameter of said bore but less than the diameter of said base.

HARRY M. FLINT.